United States Patent
Lee et al.

(10) Patent No.: US 11,379,558 B2
(45) Date of Patent: Jul. 5, 2022

(54) SYSTEM ENHANCEMENT METHODOLOGY VIA MATRIX MULTIPLICATION EFFICIENCY SPEEDUP USING SPARSE BASIS APPROACH

(71) Applicants: Gwo Giun Lee, Tainan (TW); Shih-Yu Chen, New Taipei City (TW)

(72) Inventors: Gwo Giun Lee, Tainan (TW); Shih-Yu Chen, New Taipei City (TW)

(73) Assignee: National Cheng Kung University, Tainan (TW)

( * ) Notice: Subject to any disclaimer, the term of this patent is extended or adjusted under 35 U.S.C. 154(b) by 197 days.

(21) Appl. No.: 16/872,371

(22) Filed: May 12, 2020

(65) Prior Publication Data

US 2021/0357476 A1 Nov. 18, 2021

(51) Int. Cl.
*G06F 17/16* (2006.01)
*G06N 3/04* (2006.01)
*G06K 9/62* (2022.01)
*G06F 17/12* (2006.01)

(52) U.S. Cl.
CPC ............ *G06F 17/16* (2013.01); *G06F 17/12* (2013.01); *G06K 9/6247* (2013.01); *G06N 3/04* (2013.01)

(58) Field of Classification Search
CPC ....... G06F 17/16; G06F 17/12; G06K 9/6247; G06K 9/6274; G06N 3/04; G06V 10/454; G06V 20/69

USPC ........................................................ 708/607
See application file for complete search history.

(56) References Cited

U.S. PATENT DOCUMENTS

| 2012/0069170 A1* | 3/2012 | Gesley | G06T 7/0012 348/79 |
|---|---|---|---|
| 2018/0174028 A1* | 6/2018 | Lin | G06N 3/049 |
| 2021/0174168 A1* | 6/2021 | Dalli | G06N 3/084 |
| 2021/0342677 A1* | 11/2021 | Dalli | G06N 3/0454 |

OTHER PUBLICATIONS

Shih-Yu Chen, Gwo Giun (Chris) Lee, Tai-Ping Wang, Chin-Wei Huang, Jia-Hong Chen, and Chang-Ling Tsai, "Reconfigurable Edge via Analytics Architecture," 2019 IEEE International Conference on Artificial Intelligence Circuits and Systems (AICAS), Mar. 2019.
Gwo Giun (Chris) Lee, Chun-Hsi Huang, Chun-Fu (Richard) Chen, Tai-Ping Wang, "Complexity-Aware Gabor Filter Bank Architecture Using Principal Component Analysis," Journal of Signal Processing Systems for Signal, Image, and Video Technology, pp. 1-14, Dec. 2017.

* cited by examiner

*Primary Examiner* — Tan V Mai
(74) *Attorney, Agent, or Firm* — Grace Lee Huang

(57) ABSTRACT

The present invention relates to computing-implemented method and system that improves matrix multiplication efficiency, especially to method and system optimizing matrix multiplication using sparse basis approach. Matrices to be multiplied are organized into specially ordered vectors with zero values, facilitates speed up during linear combination computation or synthesis process.

5 Claims, 4 Drawing Sheets

US 11,379,558 B2

SYSTEM ENHANCEMENT METHODOLOGY VIA MATRIX MULTIPLICATION EFFICIENCY SPEEDUP USING SPARSE BASIS APPROACH

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

FIELD OF THE INVENTION

The present invention relates to computing-implemented method and system that improves matrix multiplication efficiency, especially to system enhancement methodology via matrix multiplication efficiency speedup using sparse basis approach.

BACKGROUND OF THE INVENTION

In computing devices, a process performs mathematical operations on numerical values. One of important operation is matrix multiplication that involve producing a matrix from two augmented matrices consisting rows and columns of numerical values.

A sparse matrix is a matrix in which a majority of elements having numerical values of zero. Sparse matrices are widely used in applications such as linear algebra, many engineering disciplines, data mining/processing and graph analytics. Many these applications rely on multiplication of vectors by a sparse matrix to yield a new vector.

Recognitions by a computer are well known to be handled by machine learning techniques. Machine learning is broadly described as function of electronic system that learn from data. Neural networks, in machine learning and cognitive science, are inspired by the biological neural networks. In a typical neural network, neurons have a given activation function that operates on the inputs, and are grouped into respective layers. Neural networks depend on a large number of inputs to estimate or approximate systems and functions, and matrix multiplication operation accounts for most execution time, and thus demands for efficient method of performing such operations.

SUMMARY

To overcome these and other above-mentioned drawbacks, the computing-implemented method and system are proposed in matrix multiplication.

According to an aspect of the present invention, a matrix multiplication using sparse basis approach is able to increase its efficiency, and the sparse bases consisting of zeros facilitates a speed up during linear combination computation or synthesis process.

According to an embodiment of the present invention, a computer-implement method executed by one or more processors, comprising acts of: identifying a first matrix and an intermediate matrix to be multiplied for producing a sparse basis matrix, wherein the first matrix is a matrix of input data; applying the Gauss-Jordan Elimination (GJE) to the intermediate matrix to obtain a second matrix in reduced row echelon form (RREF); removing all zero rows from the second matrix for producing the sparse basis matrix; and determining an output matrix by multiplying a third matrix based on the sparse basis matrix, wherein the third matrix is a matrix denoting the coefficients required for a linear combination for the sparse basis matrix.

In an embodiment, the second matrix comprises
the first non-zero term in the non-zero row being equal to 1, and being defined as a pivot;
if a column contains a pivot, then the other entries in the column being zero;
the location of the pivot in each non-zero row being from left to right and from the first row to last row; and
zero rows being at the bottom of the second matrix;

According to another embodiment of the present invention, a system having one or more processors being perform matrix multiplications using sparse basis approach in a convolutional neural network (CNN).

BRIEF DESCRIPTION OF THE DRAWINGS

Embodiments of the present invention are described in more detail hereinafter with reference to the drawings, in which.

DETAILED DESCRIPTION OF THE INVENTION

The present invention is not to be limited in scope by any of the following descriptions. The following examples or embodiments are presented for exemplification only.

Matrix multiplication is the core of many data processing tasks, such as tasks including image recognition, classification and graph rendering which involve rapidly processing large amounts of numerical data. Accordingly, many processors include instructions to perform matrix multiplication, for example, each numerical value in a particular row of a matrix is multiplied by a corresponding value in a column of another matrix corresponding to the particular row. Because of the high frequency of matrix multiplication, even incremental speed improvements in matrix multiplication algorithms can lead to significant performance gains.

Figure 1:
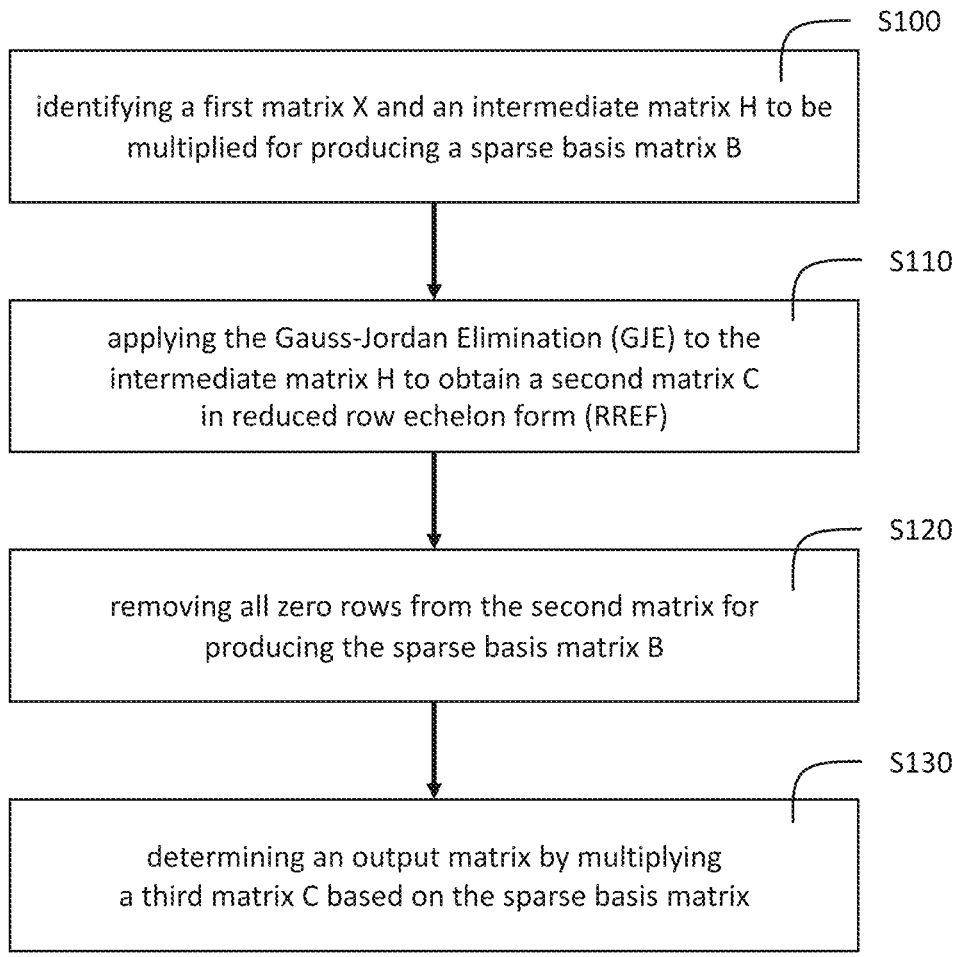
FIG. 1 is an exemplary diagram illustrating a flowchart of a computer-implement method for matrix multiplications in accordance with an embodiment of the present invention.

Accordingly, the present invention proposes new instructions for processors to perform matrix multiplication using optimum sparse basis approach to reordering the matrices to be multiplied. With reference to FIG. 1, FIG. 1 is an exemplary diagram illustrating a flowchart of a computer-implement method for matrix multiplications in accordance with an embodiment of the present invention. In this embodiment, the method comprises acts of S100 identifying a first matrix X and an intermediate matrix H to be multiplied for producing a sparse basis matrix B; S110 applying the Gauss-Jordan Elimination (GJE) to the intermediate matrix H to obtain a second matrix in reduced row echelon form (RREF); S120 removing all zero rows from the second matrix for producing the sparse basis matrix B; and S130 determining an output matrix by multiplying a third matrix C based on the sparse basis matrix. The first matrix is a matrix of input data. the third matrix C is a matrix denoting the coefficients required for a linear combination for the sparse basis matrix.

In an embodiment, the r×m sparse basis matrix B represents the transformed sparse basis matrix, and r is the rank of identified intermediate matrix H, and the third matrix C is a n×r matrix.

Any original matrix in general with size n×m before Gauss-Jordan Elimination (GJE) can be represented as:

$$\begin{bmatrix} z_{0,0} & \cdots & z_{0,m-1} \\ z_{1,0} & \cdots & z_{1,m-1} \\ \vdots & \ddots & \vdots \\ z_{n-1,0} & \cdots & z_{n-1,m-1} \end{bmatrix}.$$

In step S110 of Gauss-Jordan Elimination (GJE), rows are swapped so that leftmost element in the first row is non-zero, which is referred to as the pivot. This row is also referred to as the pivot row. For example, if $z_{0,0}$ is zero and $z_{1,0}$ is non-zero, then the first and second rows would be swapped, and the resulting matrix becomes:

$$\begin{bmatrix} z_{1,0} & \cdots & z_{1,m-1} \\ z_{0,0} & \cdots & z_{0,m-1} \\ \vdots & \ddots & \vdots \\ z_{n-1,0} & \cdots & z_{n-1,m-1} \end{bmatrix}. \quad (2, 1)$$

All elements of the pivot row are divided by the value of the pivot, resulting the value of the pivot being equal to 1. The matrix in (2, 1) then becomes:

$$\begin{bmatrix} 1 & \cdots & \frac{z_{1,m-1}}{z_{1,0}} \\ z_{0,0} & \cdots & z_{0,m-1} \\ \vdots & \ddots & \vdots \\ z_{n-1,0} & \cdots & z_{n-1,m-1} \end{bmatrix}. \quad (2, 2)$$

Multiple pivot rows are added to other rows to eliminate all elements in the columns containing pivots. Thus, except for the pivots, all elements in the columns containing pivots become zeros as shown in (2, 3):

$$\begin{bmatrix} 1 & \cdots & \frac{z_{1,m-1}}{z_{1,0}} \\ z_{0,0} - z_{0,0} & \cdots & z_{0,m-1} - \frac{z_{1,m-1}}{z_{1,0}} \times z_{0,0} \\ \vdots & \ddots & \vdots \\ z_{n-1,0} - z_{n-1,0} & \cdots & z_{n-1,m-1} - \frac{z_{1,m-1}}{z_{1,0}} \times z_{n-1,0} \end{bmatrix} = \quad (2, 3)$$

$$\begin{bmatrix} 1 & \cdots & \frac{z_{1,m-1}}{z_{1,0}} \\ 0 & \cdots & z_{0,m-1} - \frac{z_{1,m-1}}{z_{1,0}} \times z_{0,0} \\ \vdots & \ddots & \vdots \\ 0 & \cdots & z_{n-1,m-1} - \frac{z_{1,m-1}}{z_{1,0}} \times z_{n-1,0} \end{bmatrix}.$$

The previous procedure is repeated for each row starting from the second row until all rows are processed or no non-zero row exists below the pivot row.

After applying Gauss-Jordan Elimination (GJE), the matrix obtained is a matrix in reduced row echelon form (RREF) that satisfying the following conditions:

1) The first non-zero term in the non-zero row, named the pivot, is equal to 1;
2) If a column contains a pivot, then the other entries in the column are zero;
3) The location of the pivot in each non-zero row is from left to right and from the first row to last row; and
4) Zero rows are at the bottom of the matrix.

Since all operations needed to perform the Gauss-Jordan elimination are elementary row operations, they do not affect row space. Thus, the rank of the original matrix (i.e., the intermediate matrix) is the same as the rank of the matrix in RREF (i.e., the second matrix), which is equal to the number of non-zero rows in RREF.

Subsequently, in S120, removing all zero rows from the second matrix that produces the sparse basis matrix B.

Finally, in S130, the linear combination coefficient matrix, the third matrix C, is multiplied to obtain the output response. Since sparse basis matrix B has linearly independent rows, its pseudoinverse, denoted as $B^+$, is also the right inverse, i.e., $BB^+ = I_r$, where $I_r$ denotes the identity matrix with size r×r. Thus, the linear combination coefficient matrix, the third matrix, can be computed by:

$$HB^+ = CBB^+ = C \quad (2, 4)$$

This provides flexibility in reconfiguring or synthesizing the sparse bases. As a result of the second property for the sparse basis matrix B in RREF, sparse bases consisting of zeros facilitates speed up during linear combination computation or synthesis process.

Convolutional Neural Network (CNN) is usually implemented for image classification and object detection. The CNN needs to be trained before performing prediction or inference, and is divided into two parts: the feature extraction and classification. For feature extraction, several convolution layers are stacked together. The shallow convolution layers extract low-level features, such as the edges, lines, or colors; the deep layers extract middle-level features, such as the shapes, certain patterns, or textures. The deeper layers can also extract high-level features or semantic meanings, such as ears or eyes. During the classification phase, the fully connected layers are stacked together to perform classification based on the features extracted from the convolution layers.

Figure 2:
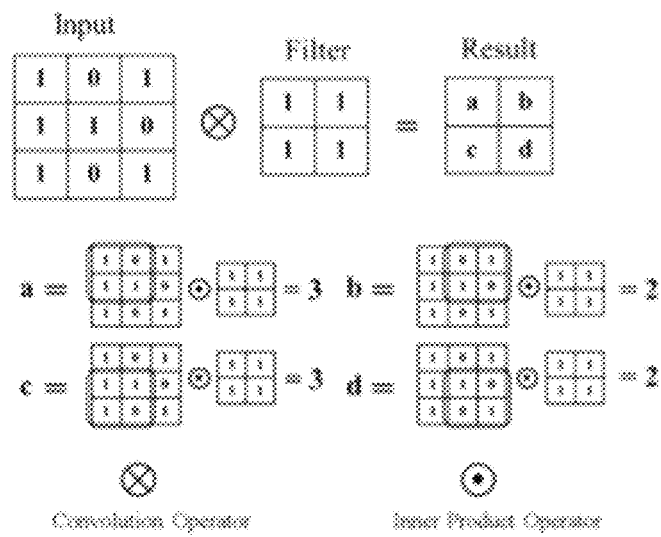
FIG. 2 is the convolution process for a single channel input with a filter.

With reference to FIG. 2, FIG. 2 is the convolution process for a single channel input with a filter. The filter slides over the input to calculate the inner product of the overlapped region of the input and computes the results.

For a 2-D k×k filter, which is expressed as a matrix:

$$F = \begin{bmatrix} f_{0,0} & f_{0,1} & \cdots & f_{0,k-1} \\ f_{1,0} & f_{1,1} & \cdots & f_{1,k-1} \\ \vdots & \vdots & \ddots & \vdots \\ f_{k-1,0} & f_{k-1,1} & \cdots & f_{k-1,k-1} \end{bmatrix} \quad (2,5)$$

where $f_{s,t}$ represents the element at $(s+1)_{th}$ row and $(t+1)_{th}$ column of filter F, and can rearranged as 1-D vector "$h_i$" via concatenating each row, starting from the first row:

$$h_i = [f_{0,0} \cdots f_{0,k-1} f_{1,0} \cdots f_{1,k-1} \cdots f_{k-1,0} \cdots f_{k-1,k-1}] \quad (2,6)$$

wherein the length is equal to k×k.

The naïve convolution process can be described as a filter kernel window sliding overlapping image data and multiplying the corresponding values of the filter kernel and input data with the accumulation of corresponding products in obtaining the output response. Since all processing of overlapping regions in the total convolution process has the same behavior, we simplify the evaluation by only processing the overlapping input region with the sliding filter window represented mathematically as:

$$Y = HX \quad (2,7)$$

$$\text{wherein } H = [h_0 h_1 \ldots h_{n-1}]^T \quad (2,8)$$

$$\text{; and } h_i \in R^m \text{ with } m = k \times k \quad (2,9)$$

The n×m matrix, H, is a set of 2-D filters, with $h_i$ denoting the $(i+1)_{th}$ filter whose length is equal to m. The same rules apply to input data X and the output response Y, whose sizes are rearranged into 1-D vectors with dimensions m×1 and n×1, respectively.

Figure 3:
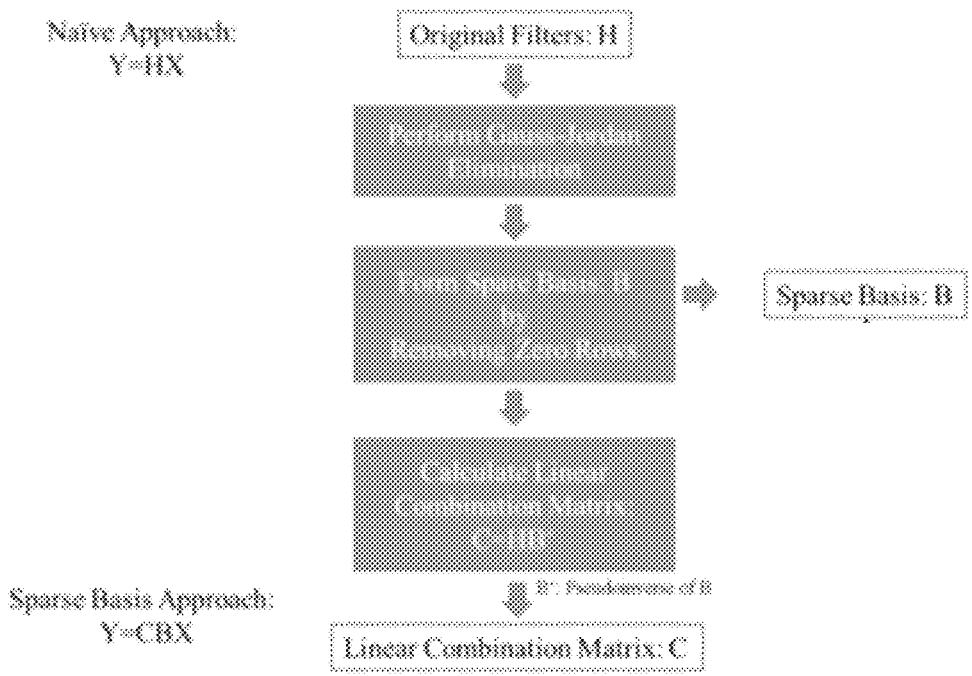
FIG. 3 is an exemplary block diagram illustrating the Sparse Basis approach on the original filters of the Convolutional Neural Network (CNN)

With reference to FIG. 3, FIG. 3 is an exemplary block diagram illustrating the Sparse Basis approach on the original filters of the Convolutional Neural Network (CNN). In this embodiment, the filter is reconstructed using the above-mentioned method illustrated in FIG. 1. The original filter of CNN can be considered as the intermediate matrix H, and the original filter is reconstructed when the third matrix and the sparse matrix are in linear combination. The filters can be regarded as a linear combination of sparse bases, so the computation can be represented mathematically as:

$$Y = HX = CBX$$

Figure 4:
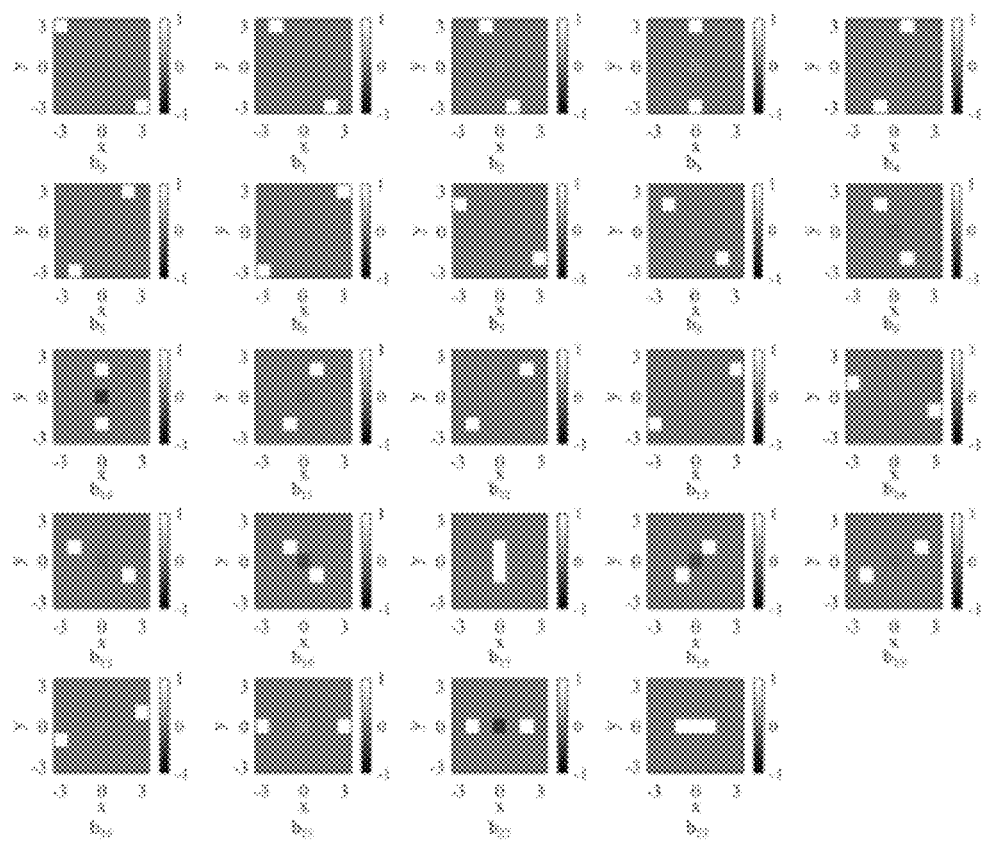
FIG. 4 is an exemplary diagram of the visualization of the sparse basis matrix for a set of 7×7 Gabor filter.

With further reference to FIG. 4, FIG. 4 is an exemplary diagram of the visualization of the sparse basis matrix for a set of 7×7 Gabor filter.

In FIG. 4, each sub-figure with $b_i$ represents $(i+1)_{th}$ basis, and is plotted by reshaping a 1-D vector into a 2-D matrix. The parameters for the Gabor filters are $\theta = \pi/8, 2\pi/8, 3\pi/8, 4\pi/8, 5\pi/8, 6\pi/8, 7\pi/8, \sigma = 2.46/\omega, \omega = \pi/2, \pi/4, \pi/6$. The sparse basis matrix after applying Gauss-Jordan Elimination (GJE) can be represented as:

$$B = [b_0 b_1 \ldots b_{23}]^T$$

Wherein $b_i \in R^m$ represents the $(i+1)_{th}$ basis. In this embodiment, each basis contains only three non-zero terms. Visualizing these three non-zero terms in this figure may be difficult as their values are small.

Figures 5A, 5B, 5C:
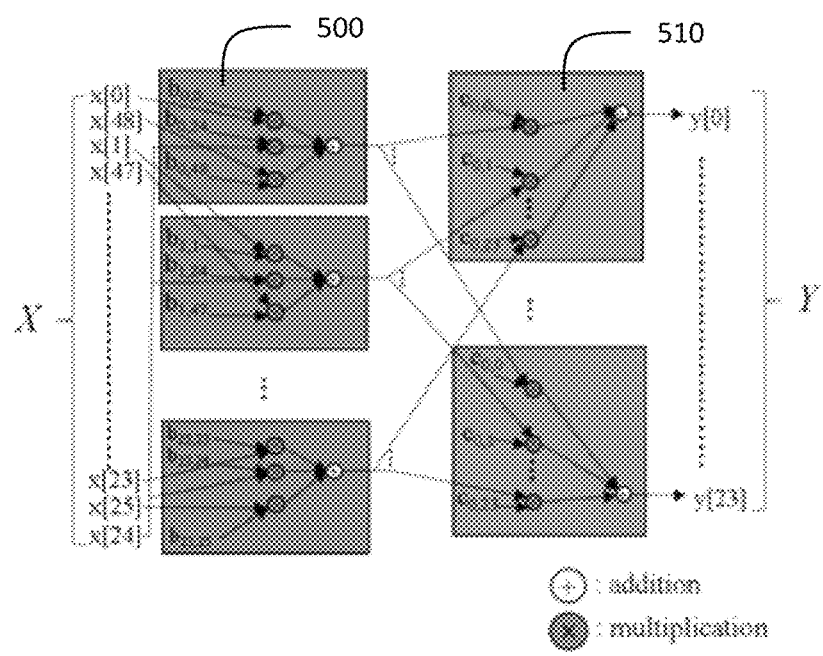
FIG. 5A is a diagram illustrating the structure of the sparse basis matrix.
FIG. 5B is a diagram illustrating linear combination coefficient matrix.
FIG. 5C is an exemplary diagram illustrating the sparse basis dataflow.

Moreover, FIG. 5 is an exemplary diagram illustrating the dataflow for sparse basis approach. FIG. 5A is a diagram illustrating the structure of the sparse basis matrix; FIG. 5B is a diagram illustrating linear combination coefficient matrix (i.e., the third matrix); and FIG. 5C is an exemplary diagram illustrating the sparse basis dataflow. In the current embodiment, as shown in FIG. 5C, a processor is given instruction to perform matrix processing in the CNN with 24 Gabor filters. The architecture can be configured into two section that has a first module 500 and a second module 510. The first module 500 computes the sparse basis for filter H, and the second module 510 outputs the response via a linear combination of these bases. Both the 24 bases' estimating modules and/or 24 linear combination modules may also be reused due to their commonality and thus provide even higher flexibility and efficiency during the architecture reconfiguration.

The processor may be a central processing unit (CPU), an application specific integrated circuit (ASIC), a field-programmable gate array (FPGA). The processor may also be a single processor core or a larger processor including multiple integrated processor cores. The processor may integrate with memory. The memory may be a storage device such as a hard drive, a Random Access Memory (RAM), flash memory or an external storage device accessed by the processor over a communication environment via, for example, Ethernet, USB, IEEE 1394 or Internet. The memory is configured for storing matrix data values.

The number of operations and data storage for the Sparse Basis approach depends on the rank of the filters and the sparsity of sparse basis. r represents the rank of the filters and k is the maximum number of non-zero elements within bases. For n filters with a size of s×s, the total addition/multiplication operations may be estimated as: k×r+r×n, where the term k×r is for computing multiplication of sparse basis matrix and input data, BX and the term r×n is for multiplying linear combination coefficient matrix; the data storage can be estimated as 2×k×r+r×n variables, where the term 2×k×r is for storing non-zero values and the location of the sparse basis, and the term r×n is due to the linear combination coefficient matrix.

Because the Sparse Basis approach can extract the hidden commonality, namely the basis matrix, our approach can be applied to any filter. Therefore, the Sparse Basis approach is orthogonal to the pruning techniques, including optional low rank approximation. The original CNN model can be used to perform pruning first; then, the proposed Sparse Basis approach can be applied to further improve the efficiency.

Experimental Results and Discussion

The efficient convolutions based on the Sparse Basis approaches was implemented within Convolutional Neural Network (CNN), and the efficiency during both training and testing phases were assessed via an intrinsic algorithm and platform independent complexity metrics, specifically, the number of operations, data transfer rate, and data storage in addition to execution time on CPU. The Sparse Basis approach via Gauss-Jordan Elimination (GJE) is applicable for any general filters including non-symmetric filters.

Four different CNN models with four different datasets were performed in the experiments. The datasets are: (1) The CNN model on Third Harmonic Generated (THG) microscopy images, (2) The CNN model on HAM10000 dataset, (3) ResNet-20 on CIFAR-10 dataset, and (4) ResNet-50 on ImageNet dataset The THG skin images are provided by Prof. Chi-Kuang Sun's Ultrafast Optics Group (UFO), from National Taiwan University (NTU). The level of dendricity for each image stack was labeled by Dr. Yi-Hua Liao, MD from National Taiwan University Hospital (NTHU) and Dr. Wei-Hung Weng, MD, also PhD in the Computer Science Department in Massachusetts Institute of Technology. Medical image analytics faces well-known challenges in the data's limited sample size, cleanliness, consistency, and completeness.

The HAM10000 dataset consists of 10,015 dermoscopy images, and each image is of size 600×450 pixels and stored as 8-bit RGB color image. There are totally seven classes for HAM10000 dataset, including (1) Actinic Keratoses (Solar Keratoses) and Intraepithelial Carcinoma (Bowen's disease), (2) Basal cell carcinoma, (3) Benign keratosis, (4) Dermatofibroma, (5) Melanocytic nevi, (6) Melanoma, and (7) Vascular skin lesions.

The CIFAR-10 is a dataset consisting of 60,000 32×32 color images for 10 classes. For each class, there are 6,000 images; these ten classes are airplane, automobile, bird, cat, deer, dog, frog, horse, ship, and truck, and etc. Among these 60,000 images, 50,000 images are for training while the other 10,000 images are for testing.

The ImageNet dataset is consisting of 1.2 million training images, 50,000 validation images, and 150,000 testing images. There are totally 1,000 classes within ImageNet dataset, and these classes are the objects in our daily lives such as dog, cat, fish, desk, banana, drum, pizza, CD player, and etc.

For the CNN model on THG microscopy images, the first and second convolution layers are both initialized via Gabor filters, and their kernel sizes are

| Experiment | (1) | (2) | (3) | (4) |
|---|---|---|---|---|
| Dataset | THG Microscopy Images | HAM10000 | CIFAR-10 | ImageNet |
| Applied Layers | 7 × 7 Conv Layer (Initialized with Gabor Filters) 5 × 5 Conv Layer (Initialized with Gabor Filters) | 15 × 15 Conv Layer (Initialized with Gabor Filters) | [3 × 3 Conv Layer] × 19 | [7 × 7 Conv Layer] × 1 [3 × 3 Conv Layer] × 16 |
| Low Rank Approximation | Yes | Yes | Yes | Yes |
| Quantization | No | No | Yes | Yes |
| Result | 1. In most situations, the proposed methods improve efficiency of CNNs. The exceptions are large kernel sizes for Sparse Basis approach. 2. Here, the convolution layers we improved are both indeed Gabor filters. This result shows that Gabor filters in the applications achieve high accuracy, and high efficiency, which implies that Gabor filters can actually capture relevant features in medicine. | | 1. Since all filters within these two CNN models are non-symmetrical, the Sparse Basis approach is applied to improve efficiency, which verify that Sparse Basis approach is applicable for non-symmetrical filters. 2. Together with quantization, we further achieve more reduction in data storage. | |

7×7 and 5×5, respectively. For the CNN model on HAM10000 dataset, the first convolution layer with kernel size 15×15 is initialized via Gabor filters. Therefore, we applied our convolution methods to these convolution layers. For ResNet-20 on CIFAR-10 dataset, we attempted to improve 19 3×3 convolution layers. For ResNet-50 on ImageNet dataset, we tried to improve one 7×7 convolution layer and 16 3×3 convolution layers. Besides, quantization is also performed on CIFAR-10 and ImageNet datasets.

Above table shows the summary and result of the four experiments.

Accordingly, a matrix multiplication in accordance with embodiments of the present invention using sparse basis approach is able to increase its efficiency, and the sparse bases consisting of zeros facilitates a speed up during linear combination computation or synthesis process.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implement method of machine learning executed by one or more processors for feature extraction and classification, the method comprising acts of:
    identifying a first matrix and an intermediate matrix to be multiplied for producing a sparse basis matrix, wherein the first matrix is a matrix of input data, and the intermediate matrix is a filter used in the machine learning;
    applying the Gauss-Jordan Elimination (GJE) to the intermediate matrix to obtain a second matrix in reduced row echelon form (RREF), wherein the second matrix includes:
        the first non-zero term in the non-zero row being equal to 1, and being defined as a pivot;
        if a column contains a pivot, then the other entries in the column being zero;
        the location of the pivot in each non-zero row being from left to right and from the first row to last row; and
        zero rows being at the bottom of the second matrix;
    removing all zero rows from the second matrix for producing the sparse basis matrix; and
    determining an output matrix by multiplying a third matrix based on the sparse basis matrix, wherein the third matrix is a matrix denoting the coefficients required for a linear combination for the sparse basis matrix.

2. The method as claimed in claim 1, wherein the act of determining an output matrix by multiplying the third matrix based on the sparse basis matrix further comprising acts of
    creating a pseudoinverse matrix according to the sparse basis matrix, wherein the sparse basis matrix has linearly independent rows; and the third matrix is determined by executing the matrix multiplication of the pseudoinverse matrix and the intermediate matrix.

3. The method as claimed in claim 1, wherein the act of applying the Gauss-Jordan Elimination (GJE) to the intermediate matrix further comprises acts of
- swapping rows in the intermediate matrix to the leftmost element in the first row being non-zero, wherein the value of the leftmost element is defined as the pivot, and the row contains the pivot is defined as the pivot row;
- all elements of the pivot row being divided by the value of the pivot that results the value of the pivot being equal to 1;
- multiple pivot rows being added to other rows to eliminate all elements in the columns containing pivots, wherein except for the pivots, all elements in the columns containing pivots become zeros; and
- repeating the previous act for each row starting from the second row until rows being processed or no non-zero row being located below the pivot row.

4. The method as claimed in claim 1, further comprising act of
applying a low rank approximation to the intermediate matrix.

5. A system comprising:
- a memory for storing matrix data; and
- one or more processors being configured to perform matrix multiplication instruction to the matrix data stored in the memory using sparse basis approach in a convolutional neural network (CNN), wherein the operation of the processor comprising acts of
- identifying a first matrix and an intermediate matrix to be multiplied for producing a sparse basis matrix, wherein the first matrix is a matrix of input data, and the intermediate matrix is a filter of the CNN;
- applying the Gauss-Jordan Elimination (GJE) to the intermediate matrix to obtain a second matrix in reduced row echelon form (RREF); and
- determining an output matrix by multiplying a third matrix based on the sparse basis matrix, wherein the third matrix is a matrix denoting the coefficients required for a linear combination for the sparse basis matrix.

* * * * *